United States Patent [19]

Solomon

[11] 4,121,110

[45] Oct. 17, 1978

[54] OPTICALLY BIASED SMOKE DETECTOR

[76] Inventor: Elias E. Solomon, 20 Christina Ct., Duxbury, Mass. 02332

[21] Appl. No.: 738,750

[22] Filed: Nov. 4, 1976

[51] Int. Cl.[2] .............................................. G01N 21/26

[52] U.S. Cl. ..................................... 340/630; 356/207; 250/574

[58] Field of Search .................... 250/574; 340/237 S; 356/103, 207

[56] References Cited

U.S. PATENT DOCUMENTS 3,916,209 10/1975 Steele et al. .......................... 250/574

3,992,102 11/1976 Kajii ................................ 250/574 X

FOREIGN PATENT DOCUMENTS 1,446,646 8/1976 United Kingdom ..................... 356/207

*Primary Examiner*—James B. Mullins

*Attorney, Agent, or Firm*—Wolf, Greenfield & Sacks

[57] ABSTRACT

An optical smoke detector for pulsed or continuous operation in which optical biasing of a light source and receiving transducer is employed to permit operation of the detector at points of greater sensitivity, stability and linearity than are found at low light levels. The optical biasing may be provided by a light-scattering optical integrator associated with the light source causing controlled impingement of light upon the field of view of the receiving transducer. Adjustment of the relative positions of the light source and transducer and of the disposition of a barrier between those elements as well as the holders of those elements provides further control of the optical biasing. The housing of the detector is provided with smoothly contoured passages for the unimpeded passage of smoke particles to an internal optical detection chamber.

19 Claims, 5 Drawing Figures

FIG. 1
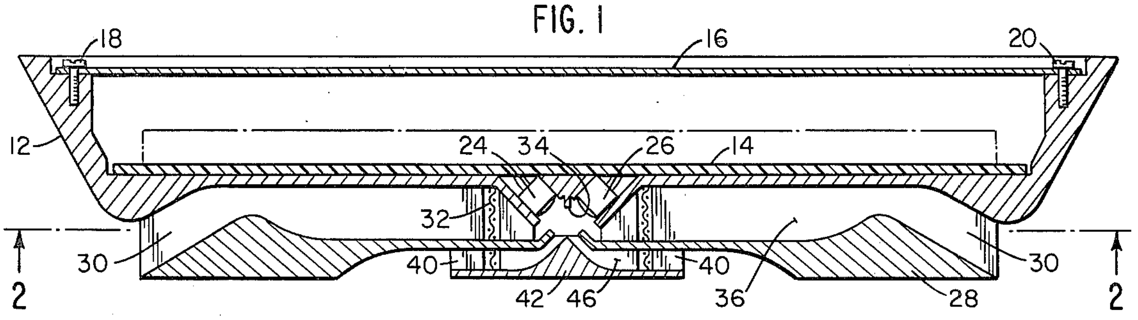
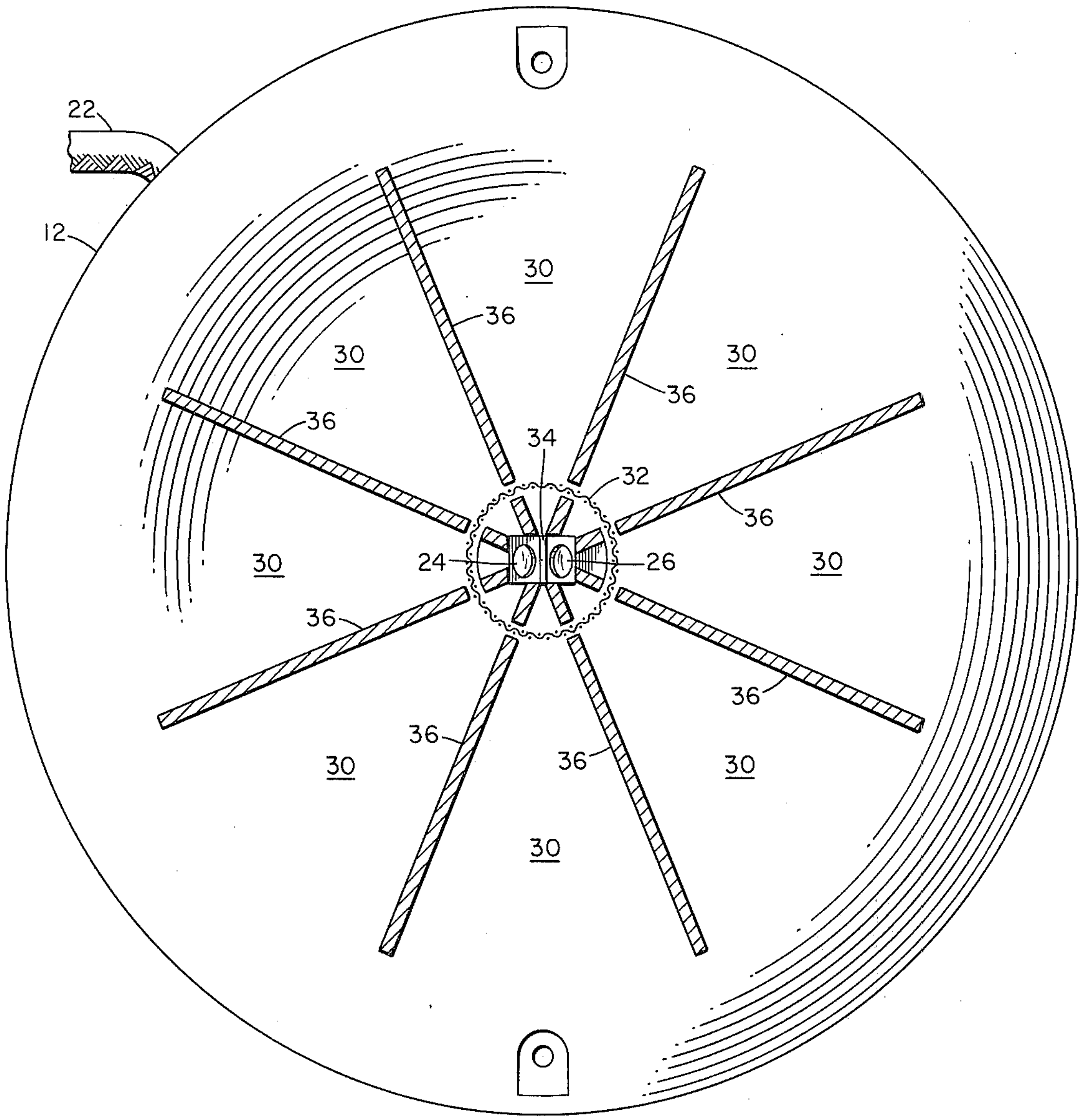
FIG. 2

OPTICALLY BIASED SMOKE DETECTOR

BACKGROUND OF THE INVENTION

In the pending application Ser. No. 725,036, filed Sept. 20, 1976, by Elias E. Solomon, who is also the inventor of the subject matter of the present application there is disclosed a smoke detector which may be of the optical or ionization type. In accordance with that disclosure, the power supply, or the regulator commonly used with the power supply, for the transmitting and receiving circuits is pulsed or strobed for periodic operation. In the case of optical detectors, the light source derives its power from the strobed power supply or regulator directly or indirectly and it, of course, is also periodically energized. A considerable reduction in power consumption compared to continuously operating systems is achieved. Still further savings in power consumption and uniformly low current demand are obtained by utilizing a reservoir which is never fully discharged between pulses.

FIELD OF THE INVENTION

As is explained in the previously referred to application, the principle of operation of most optical smoke detectors is a change of light reaching a receiving transducer, the change being caused by the entry of smoke into a detection chamber. Most commonly, light from a source is prevented from reaching the receiving transducer until smoke or other reflective object enters the field of view, at which time light is reflected to the receiver by the smoke or other reflective object and an alarm is triggered.

Inasmuch as the basic mode of operation of optical detectors turns upon light reflected by smoke, it follows that random light reflections from the source must be avoided. Conventional wisdom has dictated the use of light traps usually disposed opposite the light source, these including optically black paint to absorb unwanted reflection. In addition to light from the source, the basic theory of operation involves preventing the entry of any light, including ambient, into the detection chamber. Generally, ambient light is denied entry by using tortuous passages, including barriers, from outside the housing to the interior of the detection chamber. Yet, such passages tend to inhibit the entry of the very smoke the instrument is designed to detect.

It is a primary object of the present invention to simplify the structures and improve the operation of optical smoke detectors, whether of the strobed or continuously operating type by a scheme of optically biasing the transducer of the detector.

Another object of the invention is to increase the sensitivity of optical smoke detectors by utilizing more responsive areas of transducer operating characteristics.

A further object is to permit direct and unimpeded entry of smoke into the detection chamber of smoke detectors.

A still further object is to utilize, rather than waste, light reflected from the source to improve the efficiency of optical smoke detectors.

SUMMARY OF THE INVENTION

Basic to the present invention is the concept of deliberately permitting the entry of light in controlled amounts to the detection chamber of an optical smoke detector. By doing so in conjunction with a transducer of appropriate characteristics, operation is had in a linear region where it is better stabilized than in regions of very low light or near-dark operation. This type of operation, denoted "optical biasing" permits constant supervision of the integrity of all components as well as other improvements in detector operation.

Physically, the invention involves the use of light sources whose output may be magnified and scattered, the scattering providing desired optical biasing. Also, the housing of the detector is so designed and constructed as to permit direct access of smoke to the detection chamber through smoothly contoured passages.

The objects and features of the present invention may better by understood by a consideration of the following description and appended drawing which relates to a preferred embodiment of the invention.

BRIEF DESCRIPTION OF DRAWING

FIG. 1 is a view in cross-section of a smoke detector embodying physical features of the invention;

FIG. 2 is a bottom sectional view of the detector of FIG. 1 taken along the the lines 2—2;

DESCRIPTION OF PREFERRED EMBODIMENT

Figure 3:
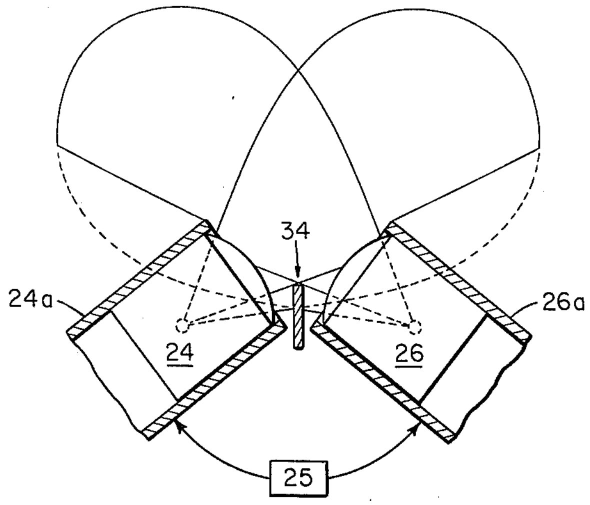
FIG. 3 is a schematic view of the light source, transducer and associated components of the detector.

In the cross-sectional view of FIG. 1 and the bottom sectional view of FIG. 2, the physical aspects of a preferred embodiment of the invention may be seen. Basic electrical operation of the detector may be in accordance with numerous prior art detectors wherein smoke passing adjacent a light source and a photosensitive transducer changes the electrical output of the transducer to trigger an alarm. Of course, the operation may also be in accordance with the teaching of copending application Ser. No. 725,036 identified and briefly described hereinabove.

The detector housing 12 may be of any desired shape but is shown as round in FIG. 1 and it may be molded of plastic or formed of metal or other convenient inexpensive materials. Preferably, a "well" is formed in the upper portion and some conventional means (not shown) is provided to permit attachment of the detector to a ceiling or wall. The well contains electrical components which are assembled on a printed circuit card 14, and a cover 16 is held in place by screws 18 and 20. Provision for entry of a connector 22 may be made by forming an opening in the housing 12 or in the cover 16. Other openings may also be similarly formed to accommodate potentiometer controls or other adjustment devices.

The circuit card 14 seals off and separates the well of the housing from the smoke detection portions lying beneath the circuit card. A light source 24 which may be a light-emitting diode (LED) and a transducer 26 which may be a phototransistor, both with suitable optics explained in greater detail hereinafter, are plugged into the lower surface of the circuit card 14.

The smoke detection portions of the device are defined by the bottom of the well, including the circuit card 14 and the upper surface of a cowl 28. The two facing surfaces are matched and smoothly contoured to provide an unimpeded passage 30 for air, and smoke, to gain access freely to the optical chamber which is circumferentially delimited approximately by a mesh cylinder 32 which serves as an insect shield. The passage 30 has no abrupt barriers or tortuous paths to prevent the free entry of smoke particles.

In the optical chamber, a barrier 34 is disposed between the light source 24 and the transducer 26 to aid in establishing a desired field of view for the transducer. The holder 24*a* for the light source and the holder 26*a* for the transducer may also be arranged to serve similar functions, all of which is further explained hereinbelow.

Further to concentrate and funnel the flow of air and smoke, especially horizontal flow, toward the optical chamber through the passage 30, a number of fins or vanes 36 are radially disposed in the passage 30. These may be formed upon the upper surface of the cowl 28 or upon the lower surface of the well of the housing 12.

The bottom of the optical chamber is also open and a passage 40 designed especially for vertical air and smoke flow is formed between the upper surface of a relatively small central deflector 42 and the lower central surface of the cowl 28. The central deflector 42 has a tapered upper surface conforming to the confronting lower cowl surface and the passage 40 serves to concentrate and funnel air and smoke flow to the optical chamber. Still further concentration is achieved by the formation of tapered radial fins 46 which may extend along the same lines as the fins 36. As in the case of the passage 30, no abrupt barriers or tortuous paths exist to inhibit easy entry of smoke particles.

Understanding the present invention is facilitated by a consideration of the operating characteristics of a typical phototransistor. As is well known, in the absence of light only leakage current flows. Also, the amount of light reflected off smoke particles as is most optical smoke detectors is of extremely low magnitude. Thus, operation of the detector at low light levels results in generation of light current barely distinguishable from leakage current.

Not only detector sensitivity is affected by low light level operation; response is non-linear. In fact, at low light levels, the generation of light current ($I_L$) varies with irradiance ($H$) as follows:

$$I_L = kH^{1.33}$$

($k$ being a constant)

On the other hand, at higher light levels the relationship between irradiance and generated light current becomes essentially linear. Operation of the detector with a controlled amount of light present at all times, here termed optical biasing, provides improved sensitivity as well as greater stability.

FIG. 3 illustrates in an idealized fashion one of several possible configurations of light source and transducer useful in the embodiment of FIGS. 1 and 2 and subject to controlled optical biasing. The elements and patterns shown are not, of course, drawn to scale and are for purposes of explanation of operation only. Here, the light source 24 and the receiving transducer 26 are arranged at an angle to one another, which angle may be adjusted by any conventional mechanical means 25 to achieve the desired optical coupling. The barrier 34, the holder 24*a* for the light source 24 and the holder 26*a* for the transducer 26 may also be made adjustable in their positions to control the field of view of the receiving transducer 26. The availability of the various adjustments permits a fine tuning of the transducer optical biasing. In other words, advantage may be taken of the most linear regions of transducer operation and the most sensitive and stable operating points may be chosen.

Figure 4:
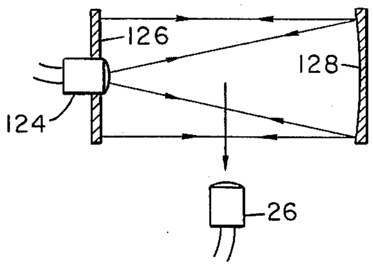
FIG. 4 is a partially schematic and idealized view of a light source illustrating light patterns in the source.

Previous note has been made of the prior art practice of excluding all ambient and reflected light (other than that from smoke particles) from the optical detection chamber. FIG. 4 illustrates a further departure of the present invention from the conventional exclusionary approach. Like FIG. 3, it is not intended as a scale drawing. For convenience, the light source 24 and the receiving transducer 26 are schematically shown at right angles to one another, but they may be arranged, and preferably are arranged, as in FIG. 3. An LED 124 is mounted centrally in a mirror 126 and operates essentially as a point source of light which has a generally conical radiation pattern as shown which falls upon a second mirror 128. The shape of the mirrors need not be limited to the planar, although two confronting planar mirrors will suffice. Other shapes such as parabolic or concave may be used and in FIG. 4 what is actually shown is a concave mirror 128 disposed axially to the light source 24. With the light source at the focal point of the mirror 128, light is reflected back toward the source as parallel beams by the concave mirror 128 in the first instance. The parallel beams strike the plane mirror 126 and are reflected back along the same path thence from the concave mirror back to the source and the cycle repeats. As a practical matter, absorption does occur but the overall effect is to greatly magnify available light in the optical paths. Similar results are obtained with other mirror shape combinations. Thus, not only is the amount of light that will reach the receiving transducer greatly increased when reflecting smoke particles are present, there is also available from scattering effects sufficient light for the optical biasing function.

Figure 5:
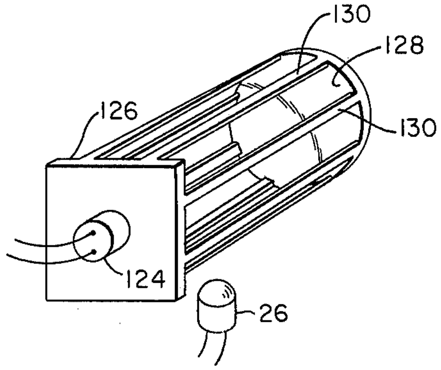
FIG. 5 is a perspective and idealized view of a light source and optical integrator.

FIG. 5, another expository figure, illustrates a further refinement of the source of FIG. 4. Here, a point source 124, a plane mirror 126 and a concave mirror 128 are arranged as in FIG. 4. However, the housing of the source assembly is apertured. The housing or apertures may take any of numerous configurations but the specific housing shown is a slotted cylinder, the solid members 130 having their inner surfaces silvered. With such structure, smoke may freely enter the light source housing and light is scattered in all directions, both primary and secondary reflected light reaching the transducer 26. Thus, an optical integrator is provided.

It is recognized that the optical biasing of the present invention is attainable in various ways and that numerous advantages in terms of applicatons and benefits are made available. Therefore, the invention should be limited only by the spirit and scope of the appended claims.

What is claimed is:

1. In an optical smoke detector wherein the presence of smoke modifies the reception by a transducer of light from a source to trigger an alarm, a system for optically biasing said transducer comprising means for determining the field of view of said transducer and for causing a controlled and determinable amount of light emanating from said source to reach said field of view of said transducer directly from said source, said means for determining including means for adjustably controlling the direct light between source and transducer.

2. In an optical smoke detector as defined in claim 1 the combination of a housing and means forming an optical detection chamber within said housing, said field of view of said transducer lying substantially within said optical chamber, said housing having at least a passage formed therein communicating externally of the detector and leading to said optical chamber, said passage being free of abrupt directional changes or barriers to the ingress of smoke particles along its full length.

3. In an optical smoke detector as defined in claim 1, the combination wherein said means for causing a controlled amount of light to reach said field of view includes reflective members disposed about said source to minimize absorption of light therefrom and to scatter light therefrom into said field of view.

4. In an optical smoke detector as defined in claim 1, wherein said means for controlling includes an optical barrier disposed between said source and said transducer and means for adjusting said barrier to determine the amount of direct light from said source impingint upon said field of view so as to provide operation in a linear region of transducer operation.

5. In an optical smoke detector as defined in claim 1 wherein said means for adjustably controlling includes means for controlling the position of at least one of said source, transducer and field of view determining means relative to the other ones thereof.

6. In an optical smoke detector wherein the presence of smoke modifies the reception by a transducer of light from a source to trigger an alarm, a system for optically biasing said transducer comprising means for determining the field of view of said transducer and for causing a controlled amount of light emanating from said source to reach said field of view of said transducer directly from said source, said means for causing a controlled amount of light to reach said field of view including reflective members disposed about said source to minimize absorption of light therefrom and to scatter light therefrom into said field of view, said source comprising a point source of light and one of said reflective members comprising a concave mirror disposed axially to said point source.

7. In an optical smoke detector as defined in claim 6, the combination wherein a second of said reflective members comprises a plane mirror, said point source being mounted centrally therein, said concave mirror being in confronting relationship to said plane mirror.

8. In an optical smoke detector as defined in claim 7, the combination wherein a third of said reflective members comprises a reflective cylinder disposed between said plane mirror and said concave mirror, said cylinder having slots formed therein whereby light may be scattered therefrom and smoke particles may pass therethrough.

9. In an optical smoke detecor wherein the presence of smoke modifies the reception by a transducer of light from a source to trigger an alarm, a system for optically biasing said transducer comprising means for determining the field of view of said transducer and for causing a controlled amount of light emanating from said source to reach said field of view of said transducer directly from said source, said means for causing a controlled amount of light to reach said field of view including reflective members disposed about said source to minimize absorption of light therefrom and to scatter light therefrom into said field of view, said reflective members include an internally reflective housing disposed about said source, said housing having apertures formed therein whereby light may be scattered therefrom and smoke particles may pass therethrough.

10. In an optical smoke detector wherein the presence of smoke modifies the reception by a transducer of light from a source to trigger an alarm, a system for optically biasing said transducer comprising means for determining the field of view of said transducer and for causing a controlled amount of light emanating from said source to reach said field of view of said transducer directly from said source, and means for mounting said source and said transducer at an angle to each other and means for adjusting said angle to vary the degree of optical coupling between said source and said transducer.

11. In an optical smoke detector as defined in claim 10 including an optical barrier disposed between said source and said transducer to intercept less than all direct light from the source to reach the transducer.

12. In an optical smoke detector wherein the presence of smoke modifies the reception by a transducer of light from a source to trigger an alarm, a system for optically biasing said transducer comprising means for determining the field of view of said transducer and for causing a controlled amount of light emanating from said source to reach said field of view of said transducer directly from said source, a housing and means forming an optical detection chamber within said housing, said field of view of said transducer lying substantially within said optical chamber, said housing having at least a passage formed therein and leading to said optical chamber, said passage being free of abrupt directional changes or barriers to the ingress of smoke particles, a plurality of vanes disposed in said passage, said vanes being oriented relative to said optical chamber to funnel smoke particles thereto.

13. In an optical smoke detector as defined in claim 12 wherein said vanes are radially arranged to direct smoke directly to the optical chamber.

14. In an optical smoke detector wherein the presence of smoke modifies the reception by a transducer of light from a source to trigger an alarm, a system for optically biasing said transducer comprising means for determining the field of view of the transducer and for causing a controlled and determinable amount of light emanating from said source to reach said field of view of said tranducer directly from said source, a housing and means forming an optical detection chamber within said housing, said field of view of said transducer lying substantially within said optical chamber, said housing having at least a passage formed therein and leading to said optical chamber, said passage being free of abrupt directional changes or barriers to the ingress of smoke particles, and a second passage adjacent the first passage for directing smoke from below the housing to the optical detection chamber.

15. In an optical smoke detector as defined in claim 14 wherein said second passage terminates in a port with said first and second passages both having vanes associated therewith oriented to funnel smoke particles to the optical chamber.

16. Optical smoke detection apparatus comprising, a housing having means delineating an optical chamber, a source of light and receiver transducer disposed at the optical chamber and with the source at least partially directed toward the receiver transducer for the optical biasing thereof, barrier means intermediate the source and receiver transducer for limiting the amount of light emanating from the source reaching directly the receiver transducer, and at least one passage formed in the housing to lead to the optical chamber, said passage extending about the circumference of the housing and further including a lower passage or funneling spoke to the optical chamber.

17. Optical smoke detection apparatus as set forth in claim 16 wherein said passage is longer than the lower passage.

18. Optical smoke detection apparatus as set forth in claim 17 wherein said housing has a cowl at least in part defining said passage and a deflector member below the cowl and at least in part defining said second passage.

19. Optical smoke detection apparatus as set forth in claim 18 wherein said cowl has a wall common to both passages and radially arranged vanes in each passage.

* * * * *